Patented May 30, 1950

2,510,036

UNITED STATES PATENT OFFICE 2,510,036

BENZODIOXANE DERIVATIVES

David T. Mowry, Dayton, Ohio, assignor to Monsanto Chemical Company, St. Louis, Mo., a corporation of Delaware No Drawing. Application June 19, 1946,
Serial No. 677,910

10 Claims. (Cl. 167—33)

This invention relates to benzodioxane derivatives and provides 2-methyl-4-keto-1,3-benzodioxane as a new compound. It also provides a method whereby benzodioxane derivatives may be prepared by the reaction between o-hydroxy aromatic acids with vinyl acetate.

I have now found that monomeric vinyl acetate may be reacted with any o-hydroxy aromatic carboxylic acid in the presence of acidic catalysts or substances furnishing hydrogen ions in solution to produce compounds having the structure:

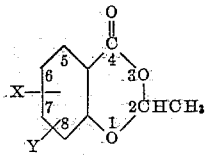

The scheme for numbering substituents is indicated in the above structural formula.

The o-hydroxy aromatic acids employed in my process may comprise any aromatic nucleus containing the carboxy group and the hydroxy group in adjacent positions in the aromatic ring. As representative of this group of o-hydroxy aromatic acids may be mentioned those compounds having the following structure:

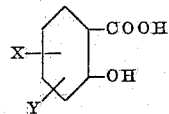

where X is Cl, Br, $CH_3$, $NO_2$ and $OCH_3$; Y is H and $CH_3$, X and Y together are benzo. Representative materials suitable for the present purpose are:

Salicylic acid
Chlorosalicylic acid
Bromosalicylic acid
Methylsalicylic acid
Dimethylsalicylic acid
Nitrosalicylic acid
Nitro methylsalicylic acid
Methyl methoxysalicylic acid
Methoxysalicylic acid
2-hydroxy-3-naphthoic acid
2-hydroxy-1-naphthoic acid, etc.

It is understood that substituents X and Y may occupy any position in the aromatic ring not occupied by the hydroxy and carboxy group.

The process is preferably carried out by refluxing the o-hydroxy aromatic acid with an excess of vinyl acetate in the presence of a material supplying hydrogen ions. Substances supplying hydrogen ions are any acid or acid salt such as $H_2SO_4$, benzene sulfonic acid, HCl, $HNO_3$, $H_3PO_4$, $NaHSO_4$, $CH_3COOH$, $BF_3$ or $ZnCl_2$. It is obvious that other acids will occur to one skilled in the art.

Mercuric acetate may be employed or not as desired.

Temperatures necessary for carrying out the reaction may range from room temperature to the boiling temperature of the reaction mixture at normal atmospheric pressure, although if desired higher temperatures may be employed by increasing the pressure upon the boiling mixture. In this way the time of reaction may be considerably shortened.

Since vinyl acetate is a polymerizable ester, it may be desirable to employ an inhibitor of polymerization in the reaction mixture. According to my understanding of the process, the polymerization inhibitor does not affect the main reaction taking place. It, however, serves to prevent polymerization of the vinyl acetate from occurring and enables one to recover the unreacted vinyl acetate for use in a subsequent operation.

The invention is illustrated by the following examples:

EXAMPLE 1

A mixture consisting of 138 g. (1.0 mol) of salicylic acid, 258 g. (3.0 mols) of vinyl acetate, 4.0 g. of mercuric acetate and 0.5 cc. of sulfuric acid was refluxed for a period of 36 hours. At the end of this time the excess vinyl acetate and acetic acid present were separated from the reaction mixture by distillation at a pressure of 200 mm. of mercury. The remainder was subsequently distilled at a pressure of 30 mm. of mercury, employing a 50 cm. Vigreux column. There was obtained a crude fraction, B. P. 153–160° C./30 mm. Two redistillations of this fraction gave 87 g. (53% yield) of a pure product, B. P. 97–98° C./1 mm., $n_D^{25}$ 1.5370, which solidified upon standing at room temperature. Recrystallization of the solid from dilute ethanol gave mono-clinic prisms, M. P. 32–33° C. of the substantially pure 2-methyl-4-keto-1,3-benzodioxane which analyzed as follows:

|        | Percent C | Percent H |
|--------|-----------|-----------|
| calcd  | 65.86     | 4.91      |
| found  | 65.80     | 5.07      |

A 5 g. sample of the 2-methyl-4-keto-1,3-benzodioxane was hydrolyzed by refluxing it with alcoholic potassium hydroxide. The effluent gas was identified as acetaldehyde by its odor and by the characteristic blue color which it is known to form with piperidine and sodium nitroprusside. Acidification of the residue resulted in the precipitation of free salicylic acid which was identified by melting point and mixed melting point with an authentic sample of salicylic acid.

In the above example, an excess of vinyl acetate was employed to serve as a diluent for the reactants. However, any liquid material which is inert under the reaction conditions may be used as solvent or diluent; or, if violent agitation be employed, the reaction may be carried out in the absence of any diluent or solvent.

Crystallization of the 2-methyl-4-keto-1,3-benzodioxane is facilitated by seeding.

The product is a white, crystalline powder having a pleasant aromatic odor and a taste reminiscent of oil of wintergreen. It is useful as a physiologically active material, as a perfume ingredient and as an insecticide.

As an insecticide, it is particularly valuable because it has the property of dissolving DDT (1,1,1 - trichloro-2,2-bis(p-chlorophenyl)ethane) and enables one to produce compound insecticides useful for certain purposes where DDT does not give satisfactory results. It is particularly valuable as a knock-down agent for flies and is also valuable in combating red spiders. It has been found that DDT is soluble to the extent of from 43-45 g. per 100 ml. of 2-methyl-4-keto-1,3-benzodioxane at 23-25° C., thus enabling the preparation of fairly concentrated solutions to be carried out.

The present product has a melting point slightly below body temperature, and in addition a pronounced tendency to supercool. It remains a liquid when applied to the body. It may, accordingly, also be employed as an insectifuge, since it has a sufficiently high vapor pressure to give a noticeable odor which, while pleasant to humans, is objectionable to insects. Against two types of mosquitoes, it showed the following repellent effect (time to first bite).

| Aedes aegypti | | | Aedes quadrimaculatus | | |
|---|---|---|---|---|---|
| No. of Tests | Range | Repellent Time | No. of Tests | Range | Repellent Time |
| 8 | 51-399 | Minutes 242 | 8 | 30-152 | Minutes 76 |

When employed as an insecticide or as an insectifuge, it may be mixed with suitable carriers such as solvents, diluents or combined with dry powdery material in any proportion.

EXAMPLE 2

2 - methyl-4-keto - 8 - methoxy - 1,3 - benzodioxane.—A mixture of 134 g. (0.8 mol) of 3-methoxy salicylic acid, 206 g. (2.4 mols) of vinyl acetate, 4 g. of mercuric acetate, 0.5 cc. of sulfuric acid and 2 g. of hydroquinone were refluxed gently in a water bath. The acid dissolved in about one hour and the material was refluxed for an additional period of eight hours. Distillation under reduced pressure gave 95 g. of crude product, B. P. 152-154° C./2 mm., which solidified in the receiver. Two recrystallizations from dilute alcohol using Nuchar (a decolorizing carbon) gave 75 g. (49%) of 2-methyl-4-keto-8-methoxy-1,3-benzodioxane, M. P. 81°.

EXAMPLE 3

A mixture of 912 g. of salicylic acid, 1730 g. of vinyl acetate, 10 g. of tertiary butylcatechol was warmed to refluxing temperature, 3 cc. of $H_2SO_4$ slowly added and refluxing continued for thirty-six hours. The product was filtered and subjected to fractional distillation. The fraction boiling above 103° C. at 21 mm. pressure was collected and then refractionated. The product boiling between 95° and 109° at 2.5 mm. was collected. The product was cooled, seeded and a crystal yield of 506 g. of 2-methyl-4-keto-1,3-benzodioxane recovered.

In a manner illustrated by the above example, vinyl acetate was reacted with chlorosalicylic acid, bromosalicylic acid, methylsalicylic acid, chloromethylsalicylic acid, nitrosalicylic acid, methoxysalicylic acid, thiosalicylic acid and 2-hydroxy-3-naphthoic acid.

The following table summarizes the chemical data obtained upon the various benzodioxanes prepared according to the present invention:

Table

| 4-Keto-1,3-benzodioxanes | Formula | Yield [1] | M. P. | B. P. | Analyses | | | |
|---|---|---|---|---|---|---|---|---|
| | | | | | Carbon, Per Cent | | Hydrogen, Per Cent | |
| | | | | | Calcd. | Found | Calcd. | Found |
| | | Per cent | °C. | °C./mm. | | | | |
| 2-Methyl | $C_9H_8O_3$ | 60 | 33 | 97-98/1 | 65.86 | 65.80 | 4.91 | 5.07 |
| 2,8-Dimethyl | $C_{10}H_{10}O_3$ | 25 | 86-87 | 164-6/25 | 67.4 | 67.4 | 5.63 | 5.64 |
| 2-Methyl-6-chloro | $C_9H_7ClO_3$ | 45 | 95-6 | 160/7 | 54.8 | 54.7 | 3.98 | [2] 3.53 |
| 2-Methyl-6-bromo | $C_9H_7BrO_3$ | 14 | 84-85 | 148-150/5 | 44.5 | 44.6 | 2.88 | 3.10 |
| 2,8-Dimethyl-6-chloro | $C_{10}H_9ClO_3$ | 15 | 130 | | 56.5 | 56.6 | 4.23 | 4.43 |
| 2-Methyl-6-nitro | $C_9H_7NO_5$ | [3] 17 | 111-112 | 182/4 | 51.7 | 51.7 | 3.35 | 3.42 |
| 2-Methyl-8-methoxy | $C_{10}H_{10}O_4$ | 49 | 81 | 152-154/2 | 61.9 | 62.1 | 5.19 | 5.28 |
| 2-Methyl-4-keto-naphthol-[2,3]-1,3-dioxane | $C_{13}H_{10}O_3$ | 41 | 91-92 | 185/2 | 72.9 | 73.2 | 4.67 | 5.09 |

[1] Yield of pure product. Crude yields were often much higher.
[2] Calcd. for Cl; 17.87%. Found: 17.62%.
[3] Yield low because of explosion during distillation.

This application is a continuation-in-part of my application Serial No. 595,067, filed May 27, 1945, now abandoned.

What I claim is:

1. Compounds having the general formula:

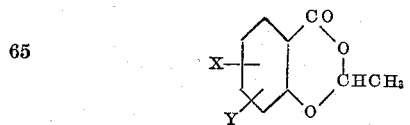

where X is selected from the group consisting of H, Cl, $CH_3$, $NO_2$, —$OCH_3$; Y is selected from the group consisting of H and $CH_3$ and X and Y together are benzo.

2. 2-methyl-4-keto-1,3-benzodioxane.

3. 2-methyl-6-chloro - 4 - keto - 1,3 - benzodioxane.

4. 2-methyl-8-methoxy-4-keto-1,3-benzodioxane.

5. The process which comprises mixing and heating together under reflux vinyl acetate and an o-hydroxy aromatic carboxylic acid in the presence of an acidic catalyst and recovering a benzodioxane from the reaction mixture.

6. The process which comprises heating under reflux a mixture of vinyl acetate and an o-hydroxy aromatic carboxylic acid in the presence of a catalytic amount of sulfuric acid and recovering a benzodioxane from the reaction mixture.

7. The process which comprises heating under reflux a mixture including an excess of vinyl acetate together with an o-hydroxy aromatic carboxylic acid in the presence of a catalytic amount of an inorganic acid and recovering a benzodioxane from the reaction mixture.

8. The process which comprises heating under reflux a mixture of vinyl acetate and salicylic acid in the presence of a catalytic amount of an acid and recovering 2-methyl-4-keto-1,3-benzodioxane from the reaction mixture.

9. The process which comprises heating under reflux a mixture of vinyl acetate and an o-hydroxy aromatic carboxylic acid in the presence of a polymerization inhibitor and a catalytic amount of sulfuric acid and recovering a benzodioxane from the reaction mixture.

10. An insecticidal or insectifugal composition containing as its active ingredient 2-methyl-4-keto-1,3-benzodioxane and a carrier therefor.

DAVID T. MOWRY.

REFERENCES CITED

The following references are of record in the file of this patent:

UNITED STATES PATENTS

| Number | Name | Date |
| --- | --- | --- |
| 2,047,675 | Dupont | July 14, 1936 |
| 2,245,131 | Hermann et al. | June 10, 1941 |
| 2,269,272 | Krefft | Jan. 6, 1942 |
| 2,406,504 | Morey | Aug. 27, 1946 |
| 2,409,134 | Lecher | Oct. 8, 1946 |

OTHER REFERENCES

Wallach, Annalen Des Chemie, Bande 193, 1878, page 41.

Chattaway et al., Chemical Abstracts, vol 26, 1932, pages 462–463.

Chem. Abstr., 1927, page 1962.

Chem. Abstr., Deccennial Index (1927–1936), page 3647. Column 3, line 55.